US007434053B2

(12) United States Patent
Parry et al.

(10) Patent No.: US 7,434,053 B2
(45) Date of Patent: Oct. 7, 2008

(54) METHODS AND SYSTEMS FOR PROVIDING AN IDENTIFICATION KEY TO A PRINTING DEVICE

(75) Inventors: Travis J. Parry, Bois, ID (US); Robert Matthew Sesek, Boise, ID (US); Keith Hoene, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 796 days.

(21) Appl. No.: 10/650,649

(22) Filed: Aug. 28, 2003

(65) Prior Publication Data

US 2005/0060546 A1 Mar. 17, 2005

(51) Int. Cl.
*H04L 9/00* (2006.01)
*G06F 7/06* (2006.01)

(52) U.S. Cl. ........................................ 713/171; 726/2

(58) Field of Classification Search .................... 710/8, 710/15–16; 713/171; 726/2
See application file for complete search history.

(56) References Cited

U.S. PATENT DOCUMENTS 5,742,756 A * 4/1998 Dillaway et al. .............. 726/20
5,807,005 A * 9/1998 Wright ....................... 400/668
6,081,850 A * 6/2000 Garney ....................... 710/15
6,084,968 A * 7/2000 Kennedy et al. ............ 380/259
6,100,994 A 8/2000 Schliekelmann et al.
6,263,170 B1 * 7/2001 Bortnem ...................... 399/13
6,351,621 B1 * 2/2002 Richards et al. ............ 399/111
6,529,691 B2 * 3/2003 Guy et al. ..................... 399/12
6,547,364 B2 4/2003 Silverbrook
6,655,779 B2 * 12/2003 Usui et al. .................... 347/19
6,738,903 B1 * 5/2004 Haines ....................... 713/168
7,182,445 B2 * 2/2007 Johnson et al. ............... 347/86
2002/0038222 A1 * 3/2002 Naka ............................ 705/1
2002/0077979 A1 * 6/2002 Nagata ........................ 705/40

OTHER PUBLICATIONS

Wong et al. (A Web-based Secure System for the Distributed Printing of Documents and Images, 1998 IEEE).*

* cited by examiner

*Primary Examiner*—Kambiz Zand
*Assistant Examiner*—Peter Poltorak

(57) ABSTRACT

One method embodiment of providing an identification key to a printing device or printing device consumable includes storing the identification key in a memory module affixed to a printing device consumable.

21 Claims, 5 Drawing Sheets

METHODS AND SYSTEMS FOR PROVIDING AN IDENTIFICATION KEY TO A PRINTING DEVICE

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Frequently, it is desirable to generate a hardcopy of a document or data set that is produced or stored on a personal computer. Consequently, a wide variety of printing devices have been developed that can receive a print job from a host computer and produce a hardcopy of the document or data represented by that print job.

As used herein and in the appended claims, "printing device" means any device that produces a hardcopy from electronic data, including, but not limited to, laser printers, inkjet printers, dot matrix printers, plotters, facsimile machines, digital copiers, photocopiers, multi-function peripherals, and the like. A printing device may produce images on a variety of print media that are in color or are monochromatic.

In order to produce hardcopy documents, a printing device uses supplies or materials that are "consumed" as documents are printed. Such consumables include, for example, toner and print media. As used herein and in the appended claims, "toner" shall be broadly defined to include any material that is selectively distributed by a printing device on a print medium to form an image. Thus, "toner" includes, but is not limited to, ink, toner, colorant, printing fluid, etc. "Print media" or a "print medium" shall be broadly defined as any medium on which a printing device prints an image. For example, types of "print media" include, but are not limited to, paper, cardboard, card stock, transparencies, vinyl, etc.

As used herein and the appended claims, the term "consumable" shall be defined to mean any material consumed by a printing device to produce hardcopy documents. For example, a consumable may be toner and the disposable cartridge or container that contains the toner in the printing device. A consumable may also be a stack or supply of print media. In addition to toner and print media, a "consumable" may be any part or portion of a printing device that is periodically replaced to allow the printing device to continue producing printed hardcopy documents.

Clearly, some effort is required to monitor a printing device and replace or re-supply a consumable as needed. Frequently, a printing device user will outsource this monitoring and replacement of consumables to a supplier or reseller. In some cases, the printing device may be rented to a user. In other cases, the printing device may be owned by its user, but serviced under a service contract that includes the resupply of consumables as needed. Suppliers and resellers of printing device consumables commonly offer Cost-Per-Page (CPP) lease contracts. Under such a lease contract, the leasor of the printing device, rather than the user or lessee of the printing device, is responsible for maintaining the printing device, including service, parts, toner, etc., for the length of the contract. Suppliers, resellers, vendors, service providers and similar businesses and personnel who rent or service a printing device for a user will be referred to collectively herein as "contractors."

SUMMARY

One method embodiment of providing an identification key to a printing device or printing device consumable includes storing the identification key in a memory module affixed to a printing device consumable.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

This specification describes a method and device for identifying a printing device consumable to a printing device to determine compatibility or for identifying a printing device to a printing device consumable as a member of a defined group of printing devices. These identifications are made based on electronic identification keys.

In one embodiment, the described method includes storing one or more electronic identification keys on a memory module attached to a printing device consumable and uploading the identification keys or an identification interface to the printing device for storage in memory and/or for verification of the compatibility of the consumable when the consumable is loaded into the printing device. With this method, the compatibility of a consumable and a printing device can be automatically determined.

Alternatively, the method may include storing an electronic identification key in the memory unit of a printing device and transmitting that key to an installed printing device consumable to identify the printing device to the consumable. The consumable may be configured to function only in a particular group of printing devices, specifically and exclusively, those printing devices that have an authorized identification key.

As used herein an in the appended claims, "verification" or "verifying" an identification key refers to the process of determining whether an identification key identifies a compatible consumable or an authorized printing device. Verification may be performed on or by a printing device to determine the compatibility of an installed consumable. Alternatively, verification may be performed on or by a consumable to determine if the printing device in which the consumable has been installed is an authorized printing device, e.g., part of a contract group that the consumable is intended to service.

As will be described below, the identification keys can be arbitrary or can include any type of identification information. For example, an identification key may be or include as a serial number, model number, name, date or any other identifier.

Figure 1:
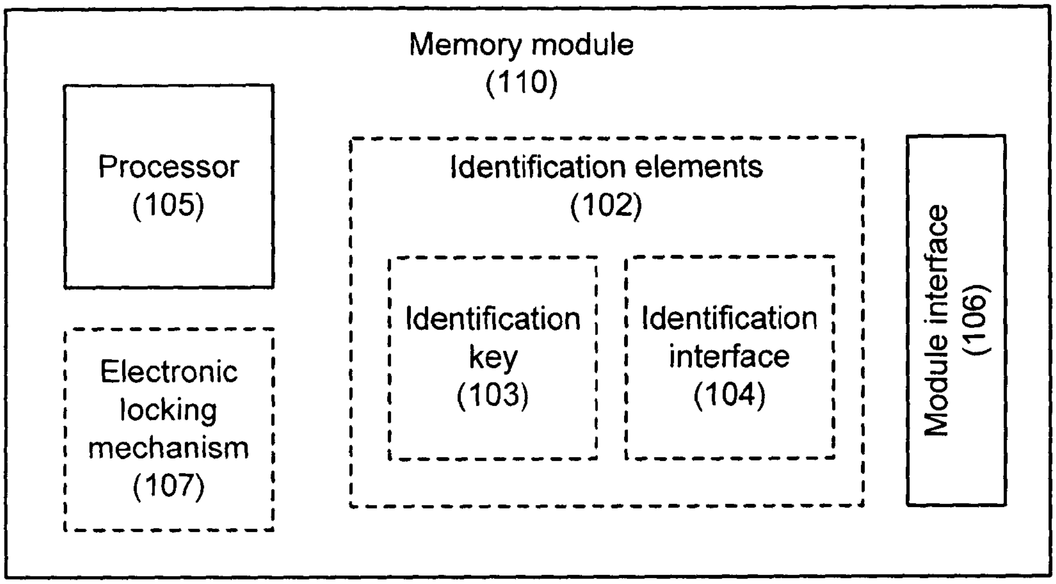
FIG. 1 is a block diagram illustrating identification elements stored on a memory module according to one embodiment.

An embodiment in which an identification key is used to identify a consumable to a printing device to determine compatibility will now be described in connection with FIGS. 1 and 2. As shown in FIG. 1, an identification key (103) and an identification interface (104) may be stored on a memory module (110). Together, the identification key (103), the identification interface (104) and any similar elements on the memory module (110) are referred to as the identification elements (102).

The memory module (110) is a non-volatile memory device, for example, Flash memory or battery-backed Random Access Memory (RAM), and includes a module interface (106) through which the data stored on the module (110), including the identification elements (102), can be accessed. The module interface (106) can be a wired or wireless interface. As will be described below, the module interface (106) interfaces the memory module (110) with a printing device so that the printing device can upload or use the identification key (103), the identification interface (104), and any other data items on the memory module (110).

In general, the identification key (103) may be any identifier for identifying the consumable to which the memory module (110) will be attached. The identification key (103) may be or include a cartridge serial number, a printing device serial number, a model number of a consumable or printing device, or a list of serial numbers, model numbers, or other identifiers, including an identifier derived from any of these other identifiers. Any combination of names, numbers, device identification tags, keys, or other means of identification may be stored on the memory module (110).

The identification key (103) may be uploaded and stored on a host printing device. Alternatively, the host printing device can access and use the identification key (103) while the key (103) remains stored on the memory module (110). The identification interface (104) is a set of computer-readable instructions that can be uploaded and executed by a host printing device to access the identification key (103) that remains on the memory module (110). The identification interface (104) may be written according to customer specifications and may be programmed in a variety of computer languages, e.g., Java, C++, COM, etc.

Figure 2:
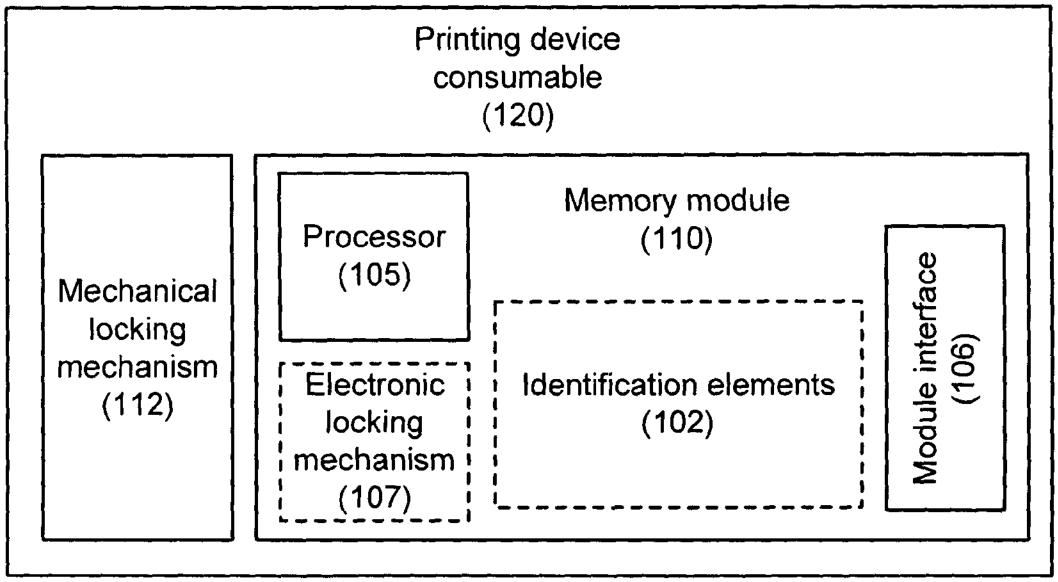
FIG. 2 is a block diagram illustrating a printing device consumable with an affixed memory module according to one embodiment.

As shown in FIGS. 1 and 2, the memory module (110) may also store an electronic locking mechanism (107). An electronic locking mechanism (107) may be computer-readable data stored on the memory module (110) that determines whether the printing device consumable may be used. For example, the electronic locking mechanism (107) may comprise a state machine, software code, or any other electronic means of rendering the printing device consumable (120, FIG. 2) unusable until the consumable has been unlocked. The electronic locking mechanism (107) is, by default, in a locked state. Consequently, the associated printing device consumable (120) is therefore unusable in any printing device unless or until the electronic locking mechanism (107) is unlocked. When the electronic locking mechanism (107) receives a signal to unlock, the electronic locking mechanism (107) is unlocked and the consumable may be used by a printing device.

Figure 3:
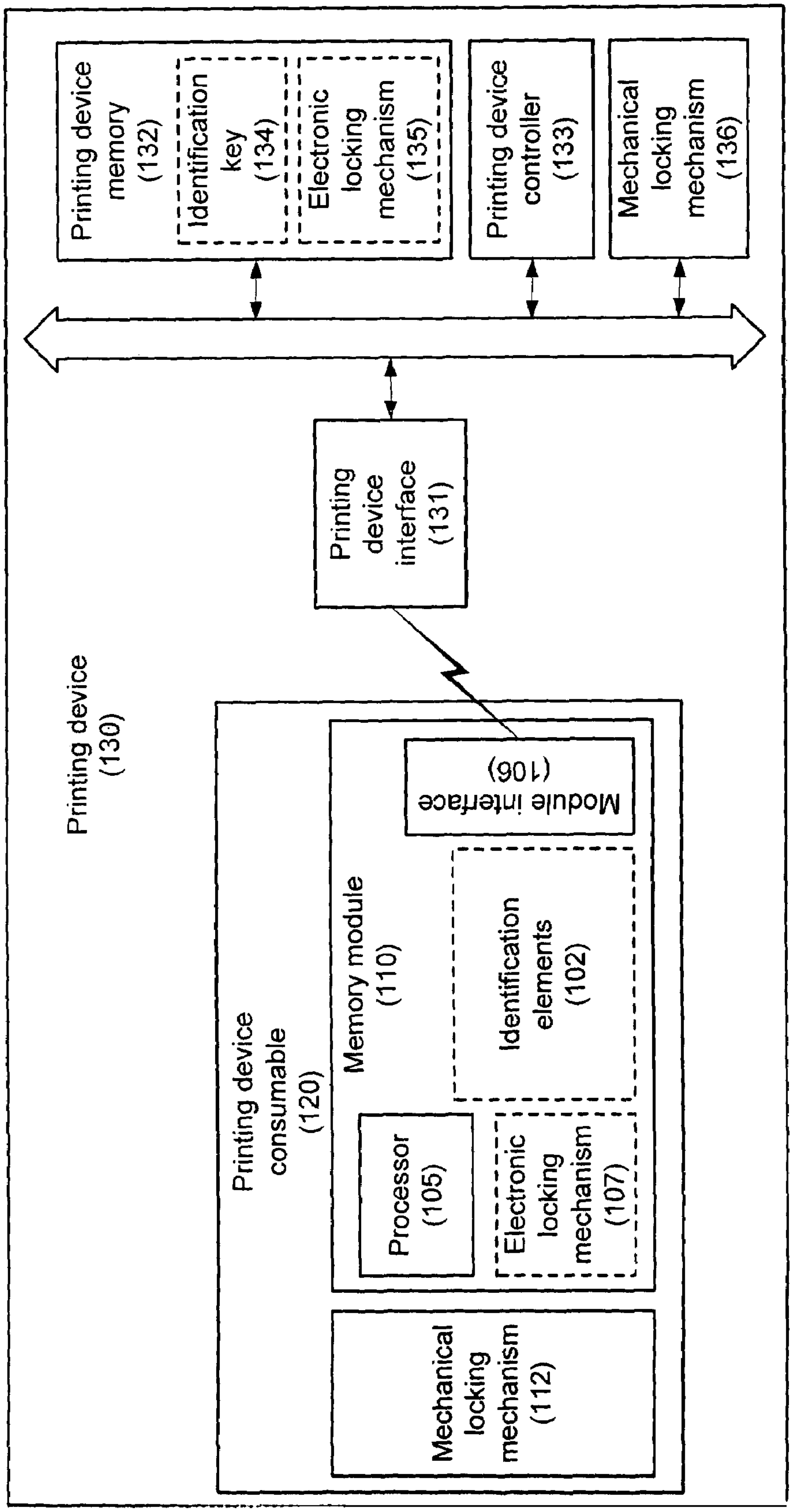
FIG. 3 is a block diagram of the consumable and memory module of FIG. 2 in use by a printing device according to one embodiment.

Additionally or alternatively, an electronic locking mechanism (135, FIG. 3) similar in function to the aforementioned electronic locking mechanism (107), may be integrated with a printing device (130, FIG. 3) and, in some cases, stored in printing device memory (132, FIG. 3). The electronic locking mechanism (135) on the printing device likewise determines whether the printing device consumable may be used. The mechanism (135) is, by default, also in a locked state, and the associated printing device consumable is therefore unusable unless or until the electronic locking mechanism (135) is unlocked. When the electronic locking mechanism (135) receives a signal to unlock from the printing device controller (133, FIG. 3), the mechanism (135) is unlocked and the consumable may be used by the printing device.

A processor (105) may be integrated with the memory module (110) for the processing of data inputs and outputs and for executing and/or controlling the electronic locking mechanism (107). The processor (105) may include a microprocessor, microcontroller, central processing unit (CPU), memory, cache, input and output interfaces, etc. The processor (105) may receive a request to unlock the electronic locking mechanism (107). As will be explained below, the processor (105) can interpret the request to unlock the electronic locking mechanism (107) and either unlock the electronic locking mechanism (107) or leave the locking mechanism (107) in its locked state.

As shown in FIG. 2, the memory module (110) is attached to a printing device consumable (120) that will be provided to, or placed in, a printing device. As indicated above, a "consumable" is any material, including toner or print media, consumed by a printing device to produce hardcopy documents. In addition to toner and print media, a "consumable" may be any part or portion of a printing device that is periodically replaced to allow the printing device to continue producing printed hardcopy documents. The memory module (110) may, for example, be attached to the disposable cartridge or container that holds the toner in the printing device. The memory module (110) may also be attached to the stack or supply of print media or to some other consumable part of the printing device, such as a replaceable imaging drum.

A mechanical locking mechanism (112) may also be attached to the printing device consumable (120). Such a mechanical locking mechanism (112) would prevent a consumable from functioning in a printing device until it is unlocked. The mechanical locking mechanism (112) may comprise a lever, latch, button, clutch, trigger, or other physical or mechanical means of rendering the consumable unusable. The locking mechanism (112) may be communicatively coupled with the processor (105) on the memory module (110). As will be described below, the processor (105) may send a control signal to the mechanical locking mechanism (112) to lock or unlock it. In its default state, the mechanical locking mechanism (112) is locked and the printing device consumable (120) is thus unusable by a printing device unless or until the locking mechanism (112) is unlocked. In some embodiments, the mechanical locking mechanism (112), after receiving a signal to unlock from the processor (105), may be unlocked mechanically, electrically, or both.

The module interface (106) provides communication between the memory module (110) and a printing device so that the printing device can upload or use the identification key (103), the identification information interface (104), and any other data items on the memory module (110). The printing device may upload the identification key (103) and other data items on the memory module (110) to a memory unit in the printing device or, alternatively, the printing device may load and execute the identification information interface (104) and use the other data items, e.g., the identification key (103), directly from the memory module (110).

As indicated, the module interface (106) may be a wired or wireless interface for transferring data between the memory module (110) and a printing device. For example, the module interface (106) may comprise input/output lines or pins for allowing wired transmission and reception of data between the memory module (110) and a host printing device. Alternatively, the module interface (106) may also include an infrared transceiver to send and receive data wirelessly with an infrared signal. In still another example, the module interface (106) may include an antenna coil to send and receive data wirelessly using, for example, a radio frequency (RF) signal. For example, a Radio Frequency Identification (RFID) method and protocol may be used to transmit data between a memory module (110) and a printing device. Using a wireless method, as described herein, is advantageous because no physical contact between the memory module (110) and printing device is required.

FIG. 3 is a block diagram illustrating a consumable (120) that has been installed in, or supplied to, a printing device (130). The consumable (120) bears a memory module (110) storing identification elements (102) for use by the printing device (130) as described above.

As shown in FIG. 3, the printing device (130) includes a printing device interface (131) that interfaces with the module interface (106) on the memory module (110). The printing device interface (131) will correspond to the module interface (106) to allow communication between the memory module (110) and the printing device (130). Consequently, the printing device interface (131) may be a receptacle for receiving the pins or wired traces of a wired module interface (106). Alternatively, the printing device interface (131) may be a wireless transceiver for communicating with a wireless transceiver of the module interface (106). In one embodiment, the memory module (110) may comprise an RFID memory tag as part of the module interface (106), and the printing device interface (131) may comprise an RFID interrogator. Alternatively, the module interface (106) and printing device interface (131) may, for example, be an infrared interface. The printing device interface (131) and the module interface (106) will be referred to collectively as the interface (106, 131).

The printing device (131) can upload the identification elements (102) and any other data items on the memory module (110) through the interface (106, 131). The identification elements (102) and any other uploaded data items may be stored in the memory unit (132) of the printing device (130). This printing device memory (132) may comprise both volatile and non-volatile memory, both writable and read-only memory. If the identification elements (102) are uploaded to the memory unit (132), those identification elements (102) may be stored in non-volatile memory so as to be available each time the printing device (130) is powered up.

Alternatively, the interface (106, 131) can allow the printing device (130) to use the identification elements (102) and other data items directly from the memory module (110) without uploading or storing all the identification elements (102) in the printing device memory unit (132). This is done by uploading the identification interface (104, FIG. 1) from the memory module (110) and using the identification interface (104, FIG. 1) to access the identification key (103, FIG. 1) and/or other identification elements (102) from the memory module (110). In such an embodiment, the identification interface (104) may be uploaded to volatile or non-volatile memory in the printing device memory unit (132). If the identification interface (104) is kept only in volatile memory, the identification interface (104) may be uploaded each time the printing device (130) is powered up. This will reduce the demands on non-volatile memory.

A mechanical locking mechanism (136) may also be incorporated in the printing device (130). Such a mechanical locking mechanism (136) would prevent the printing device (130) from accepting and using an installed consumable (120), or otherwise prevent the printing device (130) from functioning, until the locking mechanism (136) is unlocked. The mechanical locking mechanism (136) may comprise a lever, latch, button, trigger, or other physical or mechanical means of rendering the printing device (130) unusable. The locking mechanism (136) may be communicatively coupled with the printing device controller (133). As will be described below, the controller (133) may send a control signal to the mechanical locking mechanism (136) to lock or unlock it. In its default state, the mechanical locking mechanism (136) is locked and the printing device (130) is thus unusable unless or until the locking mechanism (136) is unlocked. In some embodiments, the mechanical locking mechanism (136), after receiving a signal to unlock from the controller (133), may be unlocked mechanically, electrically, or both.

A printing device controller or processor (133) controls the operation of the printing device (130) according to firmware stored in the printing device memory (132). The printing device controller (133) will determine what portions of the identification elements (102) to upload for storage in the memory unit (132). For example, the controller (133) will determine whether to upload the identification key (103, FIG. 1) for storage in the printing device memory unit (132). Alternatively, the controller (133) may upload only the identification interface (104, FIG. 1), which will allow the controller (133) to access and use the identification key (103, FIG. 1) that remains stored on the memory module (110, FIG. 1). In some embodiments, the identification elements (102, FIG. 1) may be loaded into non-volatile memory at the time the printing device (130) is powered on. Alternatively, the identification elements (102, FIG. 1) may be loaded into volatile memory when key verification takes place. The controller (133) may also selectively unlock the electronic locking mechanism (135) and/or the mechanical locking mechanism (136) of the printing device (130). In some examples, the controller (133) can compare the identification key (103, FIG. 1) received with a list of authorized identification keys stored in the printing device memory (132). The controller (133) may then unlock either or both of the locking mechanisms (135, 136) or leave the locking mechanisms (135, 136) in their locked state depending on the compatibility of the consumable (120).

Key verification is a process in which the controller (133) will identify the consumable (120) using the identification key (103, FIG. 1) stored on the memory module (110) of the consumable (120). A list of the types of consumables compatible with the printing device (130) and/or identification keys for such consumables is stored in the memory (132) of the printing device. The controller (133) compares the identification key (103, FIG. 1) for the present consumable (120) with this list to determine if the installed consumable (120) is compatible with the printing device (130). This verification may be performed periodically or in response to particular events, such as at the time the consumable is inserted or installed, when the printing device is powered on, after printing each print job, after a certain number of pages have been printed, etc.

As indicated, if the identification key (103, FIG. 1) is uploaded and stored in the memory unit (132), the controller (133) can then use that identification key (103, FIG. 1) to verify that the consumable is compatible with that printing device. Alternatively, the controller (133) may upload the identification interface (104, FIG. 1) to the printing device memory unit (132). The controller (133) will then use the identification interface (104, FIG. 1) to access and use the identification key (103, FIG. 1) that remains stored on the memory module (110, FIG. 1) to verify the compatibility of the consumable with the printing device. Once the compatibility of the consumable (120) has been verified, the controller (133) will unlock the electronic locking mechanism (135) and/or the mechanical locking mechanism (136) of the printing device (130). The controller (133) may then relock one or both of the locking mechanisms (135 and 136) prior to the next verification of the consumable's compatibility, such as when the consumable (120) is removed, the printing device (130) is powered down, a print job is completed, etc.

Once the identification elements (102) are available to the printing device (130), either stored in the printing device memory (132) or available directly from an interfaced memory module (110), the identification elements (102) can be used to verify that the consumable is compatible with that printing device. The controller (133) may be programmed to automatically access the identification elements (102) and check the identification key (103, FIG. 1) to verify whether the consumable is compatible with a particular printing device.

Additionally or alternatively, the printing device (130) may have its own identification key (134) stored in the printing device memory (132). This key (134) can be used identify the printing device (130) to the consumable (120).

For example, if a contractor is providing consumables for use in a printing device or a group of printing devices under contract, the contractor will want that consumable to only be used in an authorized printing device, i.e., a printing device under contract. Consequently, the processor (105) of the memory module (110) may be programmed to query the printing device (130) for its identification key (134). This key (134) can then be compared by the processor (105) to a list of keys identifying authorized printing devices. If the printing device's key (134) indicates an authorized printing device, e.g., a printing device under contract, the processor (105) will release the electronic locking mechanism (107) and/or the mechanical locking mechanism (112) to allow the consumable (130) to be used by the host printing device. If the printing device does not provide an authorized identification key, the consumable (120) will remain locked and unusable.

Figure 4:
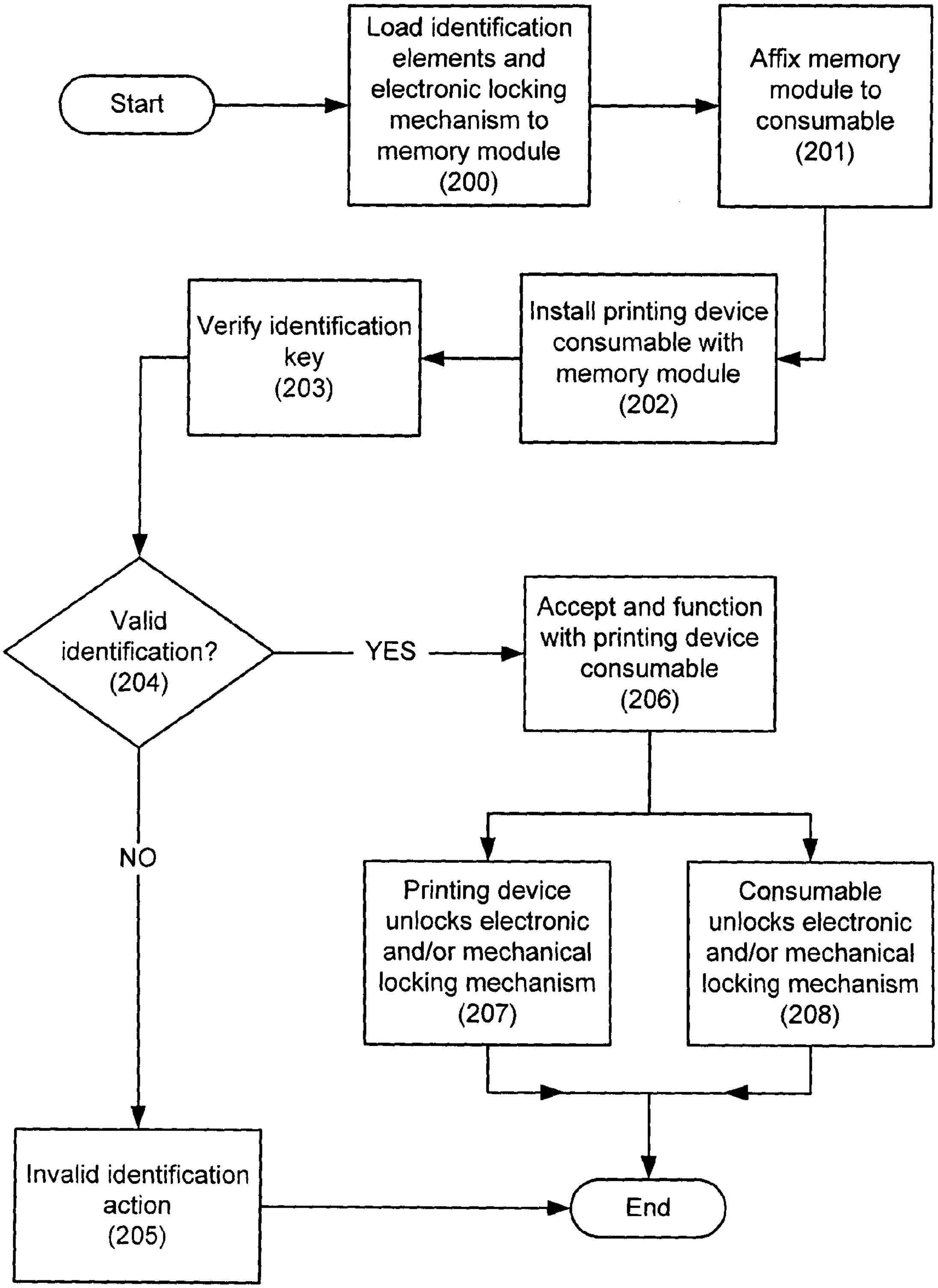
FIG. 4 is a flowchart illustrating a method of providing an identification key for a printing device according to one embodiment.

FIG. 4 is a flowchart illustrating a method of providing an identification key to a printing device to identify a consumable to the printing device or providing an identification key from a printing device to a consumable to identify the printing device to the consumable as an authorized printing device. As shown in FIG. 4, identification elements, and in some examples, an electronic locking mechanism, are loaded on a memory module (step 200). The memory module may be any memory device capable of storing computer-readable data and instructions including, but not limited to, Flash memory, battery-backed RAM, etc. The memory module is then attached or affixed to a consumable that will be used in or by a printing device (step 201). For example, the memory module may be attached to a toner cartridge.

After a printing device consumable, e.g., a toner cartridge, print media stack, etc., with the attached memory module has been installed in a printing device (step 202) an identification key verification may be performed (step 203). This verification may include the printing device verifying the compatibility of the consumable or may include the consumable verifying that the printing device is authorized to receive the consumable, such as under a service contract. If the printing device is verifying the compatibility of the consumable, the printing device controller may request or retrieve an identification key from the printing device consumable. If the consumable is verifying the authorization of the printing device, a processor on the consumable may request an identification key from the printing device. Both of these possibilities will be described in further detail below.

In some embodiments, the printing device (130, FIG. 3) accesses or requests the identification key (103, FIG. 1) on the memory module (110, FIG. 1) of the consumable (120, FIG. 2) to determine if the stored identification key on the consumable identifies a consumable that is compatible with that particular printing device. For example, if a serial number was used as the identifier in the key, the printing device would check the serial number against a list of valid serial numbers in the printing device memory (132, FIG. 3). If the serial number provided by the printing device consumable matched one of the serial numbers on the list of valid serial numbers, the printing device would accept and function with the printing device consumable. If the identification of the consumable does not indicate a compatible consumable (step 204), an appropriate action will be taken as described below (step 205).

Alternatively, if the consumable has a processor (105, FIGS. 1 & 2) in connection with its affixed memory module, the consumable processor may access or request an identification key from the printing device. The consumable processor (105) then determines based on this identification key if the printing device is authorized to receive and use the consumable, for example, the printing device is a member of a contract service group for which the consumable was specifically provided. As above, if this identification verification fails, the consumable may refuse to function with the printing device by, for example, refusing to unlock any electronic or mechanical locking mechanisms (107, 112; FIG. 2).

There are a number of scenarios where the identification key verification (step 203) may take place. In one embodiment, the verification (step 203) may occur each time the printing device is powered up. In another embodiment, the identification key verification (step 203) may occur each time a new consumable is inserted or installed in the printing device. In another embodiment, the identification key verification (step 203) may occur periodically, according to a set time or production interval. For example, this interval may be after printing a print job, after printing a certain number of pages, after a certain set of functions have been executed, etc.

The identification key verification (step 203) may involve the printing device accessing the identification key from the consumable. The identification key received from the consumable may be compared with the printing device's identification key (134, FIG. 3) or list of valid identification keys. If the identification key of the consumable (103, FIG. 1) matches the printing device identification key (134, FIG. 3), or one of the keys from the list of valid identification keys, the consumable may be considered verified and allowed to function with the printing device (determination 204). Alternatively, if the memory module (110, FIG. 1) includes a processor (105, FIG. 1), key verification may be performed on the memory module (110, FIG. 1). In such a case, the memory module (110) would receive an identification key from the printing device and compare that key with the identification key (103, FIG. 1) on the memory module (110, FIG. 1) to determine compatibility. The processor on the memory module may also be checking the identification key from the printing device to determine if the printing device is a member of a contract group and authorized to use the consumable.

If there is an incompatibility or lack of authorization discovered, one or more identification keys are invalid (determination 204) for example, an invalid identification action is carried out (step 205). An invalid identification action (step 205) may include a notice appearing on a computer monitor or a display device of a user interface on the printing device indicating that the consumable is incompatible with the printing device or that the printing device is not authorized to use the consumable. Additionally, information on how to fix the compatibility problem, if possible, may be displayed along with the indication of incompatibility.

The printing device may also be programmed to refuse to accept or execute print jobs if an incompatible consumable is loaded (step 205). Additionally or alternatively, the consumable may refuse to release any locks, electronic or mechanical, preventing use of the consumable if an incompatibility or lack of authorization is detected (step 205).

A printing device that has been programmed to perform an identification key verification (step 203) may be programmed to permit the use of a consumable that does not bear an identification key. Alternatively, a printing device that has been programmed to perform an identification key verification (step 203) may be programmed to prohibit the use of any consumable that does not bear an identification key. This would be advantageous in a situation where the customer wanted to carefully monitor and control their printing process, e.g. how many pages were printed with a particular consumable, etc.

If the identification elements are valid and complete (determination 204), the printing device will accept the printing device consumable (step 206) or vice versa. In step 207, the printing device (130, FIG. 3) unlocks either the electronic locking mechanism (112, FIG. 2) stored on the printing device memory (132, FIG. 3) or the mechanical locking mechanism (136, FIG. 3) on the printing device (130), or both. There are a number of different scenarios in which a printing device or printing device consumable may unlock a mechanical or electronic locking mechanism. After the printing device consumable (120, FIG. 3) is accepted (step 206), the printing device controller (133, FIG. 3) may send a request from the printing device (130) to unlock the electronic locking mechanism (135) and/or the mechanical locking mechanism (136). If determination (204) was in the affirmative, the electronic locking mechanism (135) stored in the printing device memory (132) and/or the mechanical locking mechanism (136) on the printing device (130) is/are unlocked (step 207). Both the mechanical and the electronic locking mechanisms (135, 136) will remain unlocked unless or until the printing device is powered off, a new or different consumable is inserted or installed, the set interval has been reached, etc.

In step 208, the printing device consumable (120, FIG. 3) unlocks the mechanical locking mechanism (112, FIG. 2) and/or the electronic locking mechanism (107, FIG. 2) on the consumable (120). After being accepted and allowed to function with the printing device (step 206), the processor (105, FIG. 2) on the consumable may receive a request from the printing device (130) to unlock the mechanical and/or electronic locking mechanisms (112, 107). If determination 204 was in the affirmative, the mechanical locking mechanism (112) and/or the electronic locking mechanism (107) on the consumable (120) is/are unlocked (step 208). Both the mechanical and the electronic locking mechanisms (112, 107) will remain unlocked unless or until the printing device is powered off, a new or different consumable is inserted or installed, the set interval has been reached, etc.

Figure 5:
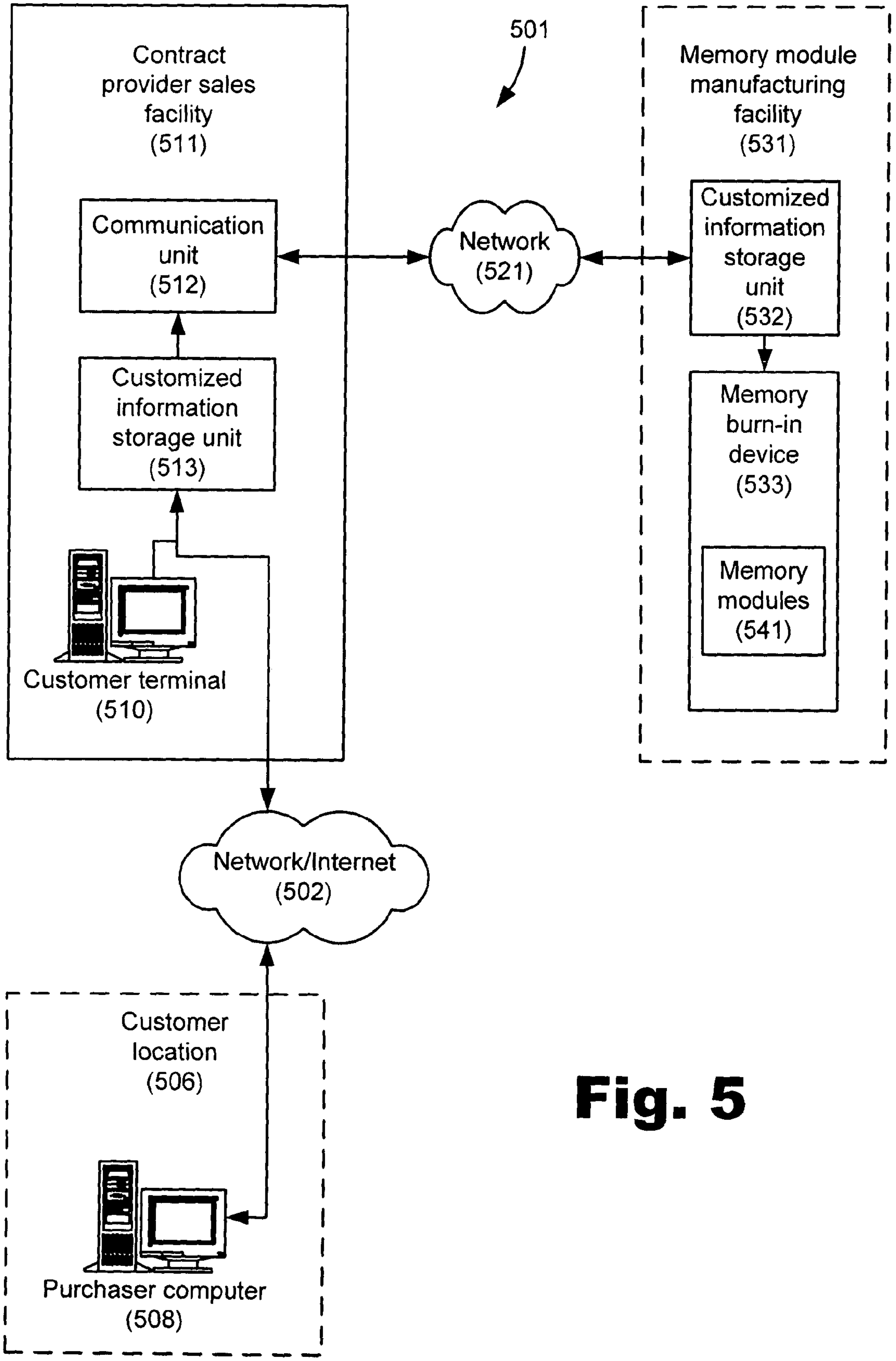
FIG. 5 is a block diagram illustrating a system for customizing identification elements on memory modules according to one embodiment.

FIG. 5 is a block diagram illustrating a system in which the information on the memory module of a consumable can be customized for particular purchasers. FIG. 5 relates generally to the scenario in which consumables are supplied to a printing device or group of printing devices by a contractor under a service contract. The contractor may want to assure that only those printing devices under the service contract receive the supplied consumables. Consequently, the owner of the printing devices can identify which printing devices are being serviced under the contract, and the contractor can program the provided consumables to require that a printing device properly identify itself as being part of the group serviced under the contract before the consumable releases any locks or allows itself to be used by that printing device.

As shown in FIG. 5, the system (501) may include components at up to three different locations: a customer location (506), a contractor sales facility (511) and a memory module manufacturing facility (531). The following are possible scenarios for a customer who wishes to define a printing device group under a service contract.

For example, a purchaser may visit a sales facility (511). The sales facility (511) may include a customer terminal (510) into which a purchaser can enter the information to define a printing device group. For example, the purchaser, using the customer terminal (510), can enter the quantity and/or type of printing devices and the printing device serial numbers, IP addresses or other identifiers that distinguish the printing devices they wish to have serviced, i.e. to receive and accept consumables from that provider. Alternatively, the purchaser could telephone, fax, email or otherwise transmit the information to the sales facility (511), whereupon sales facility personnel would enter the information into the terminal (510).

The information is then stored for use by the contractor in the customized information storage unit (513). As will be described below, the contractor may use the purchaser input to create identification keys to be used by consumables to identify printing devices under the service contract. The information is then sent to a communication unit (512). The communication unit (512) transfers the information for customizing the memory module to a memory module manufacturing facility (531). The communication unit (512) may communicate with the manufacturing facility (531) through a network (521). The network (521) may be a private or public network, and may include the Internet. The sales facility (511) and the manufacturing facility (531) may be at the same location or may be in different cities or even on different continents.

The information for customizing the memory module is stored in a data storage unit (532) until it is time to prepare the customized memory module. The information is then read into the system that forms the customized memory module, for example, a memory burn-in device (533). The burn-in device (533) then creates the customized memory module (541) desired by the contractor by loading the desired data onto the memory module (541). The customized memory module (541) is then affixed to the ordered consumable and shipped to the purchaser.

In a different scenario, the purchaser need not visit the sales facility (511) to place an order for consumables under a particular service contract. Rather, the purchaser can use a computer (508) at the customer's location (506). For example, the purchaser, using the computer (508) can contact the communication unit (512) electronically. In one embodiment, the communication unit (512) includes a web server that the purchaser accesses through the Internet (502). The purchaser then inputs the information for defining and identifying the printing devices in a group under a service contract. This information is then transmitted to the communication unit (512), which may treat the information in the same manner as if entered through the customer terminal (510) at the sales facility (511). The information is then loaded to a customized memory module (541) as described above.

Figure 6:
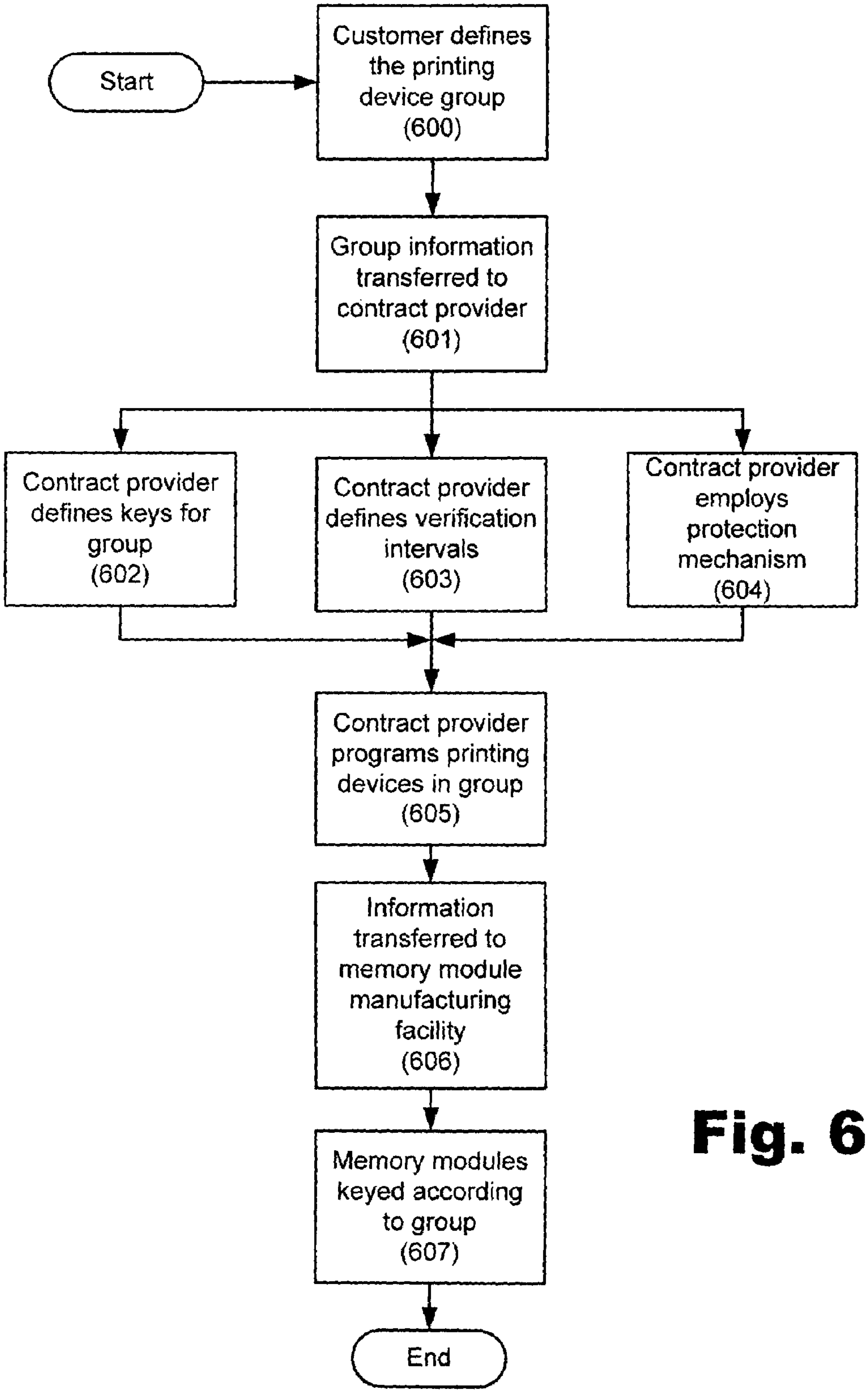
FIG. 6 is a flowchart illustrating a method of generating a customized identification key according to one embodiment.

FIG. 6 is a flowchart illustrating a method of generating an identification key or list of keys for a printing device or printing device consumable. As described in FIG. 5, the user may specify which devices are to be placed under contract, thus defining a printing device contract group (step 600). The group information is then transferred to the contractor provider (step 601). As described above in FIG. 5, user input can be transferred to the sales facility (511, FIG. 5) from the customer location (506, FIG. 5) or from the customer terminal (510, FIG. 5).

Once the contractor knows which printing devices are to be placed under contract and are, therefore, members of a particular printing device contract group, the contractor may use that information to create a customized key or list of keys. The information stored in the information storage unit (513, FIG. 5) may be used to create a customized key or list of keys particular to a group of printing devices. The contractor may select any identifier, for example, a serial number, model number, name, date, IP address, etc., or any combination or derivative of such identifiers to create the identification key (step 602). The contractor may also specify a list of keys for a group such that each key on the list is valid for that particular group.

The contractor may also specify identification key verification (step 203, FIG. 4) intervals (step 603). For example, the verification may occur after printing a print job, after a certain number of pages have been printed, after a particular function has been performed, etc. This information may also be stored in the information storage unit (513, FIG. 5).

In some embodiments, the printing devices to be placed under contract may be programmed with a protection mechanism (step 604) such that when enabled, the user or customer cannot change the customized key, list of keys, identification key verification interval or any other information the contractor wishes to protect. This protection mechanism may include an authentication system requiring an administrator name and password or other authentication means.

The printing device firmware may then be programmed (step 605) with some or all of the following: a customized key or list of keys for a particular group (step 602), a specified identification key verification interval (step 603), a protection mechanism such as an authentication system (step 604), or any other information the contractor desires. All or part of this information may then be transferred to the memory module manufacturing facility (step 606) whereupon the customized memory modules will be produced (step 607) as described in FIG. 5.

As will be appreciated by those skilled in the art, the methods described above and similar methods can be implemented in part by providing appropriate programming to the printing device controller of a printing device or to a processor affixed to a printing device consumable so as to program those devices to perform as described above. Such programming may also be referred to a machine-readable instructions and may be stored on any medium capable of storing such instructions, for example, a floppy disk, compact disc (CD), semiconductor memory, etc. When implemented, the instructions are then stored in memory on the printing device or on the printing device consumable as needed.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of using a printing device consumable, said method comprising storing an identification key in a memory affixed to said printing device consumable, receiving said identification key in a printing device and accepting said printing device consumable for use in said printing device only if said identification key identifies a compatible printing device consumable, wherein said accepting said printing device consumable comprises unlocking a locked locking mechanism that, when locked, disables either said printing device consumable or said printing device; and further comprising uploading identification interface from said memory to said memory of said printing device and receiving said identification key through said identification interface.

2. The method of claim 1, wherein receiving comprises uploading said identification key from said memory to a memory of said printing device.

3. The method of claim 1, wherein said locking mechanism comprises a mechanical locking mechanism and unlocking said locking mechanism comprises disengaging said mechanical locking mechanism.

4. The method of claim 1, wherein said locking mechanism comprises an electronic locking mechanism and unlocking said locking mechanism comprises disabling said electronic locking mechanism.

5. A method for verifying a printing device consumable, said method comprising:

storing an identification key on a printing device consumable memory;

interfacing said memory with said printing device;

verifying said printing device consumable for use with said printing device based on said identification key; and disengaging a locking mechanism that selectively disables said printing device upon verification of said identification key;

wherein said printing device periodically reengages said locking mechanism prior to re-verifying said identification key; and further comprising reengaging said locking mechanism after a specific period of time after a previous verification of said printing device consumable.

6. The method of claim 5, further comprising uploading said identification key from said memory to a printing device memory.

7. The method of claim 6, further comprising verifying said identification key on said printing device.

8. The method of claim 7, wherein said verifying said identification key comprises:

checking said identification key against a list of authorized keys for said printing device; and enabling use of said printing device consumable by said printing device if said consumable is compatible with said printing device.

9. The method of claim 8, further comprising storing said list of authorized keys on said printing device memory.

10. The method of claim 7, wherein said verifying said identification key comprises:

checking said identification key against a list of authorized keys for said printing device; and enabling use of said printing device consumable by said printing device if said consumable is compatible with said printing device.

11. The method of claim 5, further comprising:

uploading an identification interface from said memory to said printing device; and accessing said identification key on said memory through said identification interface.

12. The method of claim 11, further comprising verifying said identification key on said printing device.

13. The method of claim 11, wherein said printing device consumable is inoperable in said printing device until said identification key has been verified.

14. The method of claim 11, wherein said consumable is locked with a locking mechanism and the method further comprising unlocking said locking mechanism after said identification key has been verified.

15. The method of claim 14, wherein said unlocking comprises receiving a control signal to unlock said locking mechanism from a printing device controller.

16. The method of claim 5, wherein said locking mechanism comprises a mechanical locking mechanism and disengaging said locking mechanism comprises physically disengaging said mechanical locking mechanism.

17. The method of claim 5, wherein said locking mechanism comprises an electronic locking mechanism and disengaging said locking mechanism comprises disabling said electronic locking mechanism with a control signal.

18. The method of claim 5, further comprising reengaging said locking mechanism whenever said printing device is powered up.

19. A method for verifying a printing device consumable, said method comprising:

storing an identification key on a printing device consumable memory;

interfacing said memory with said printing device;

verifying said printing device consumable for use with said printing device based on said identification key; and disengaging a locking mechanism that selectively disables said printing device upon verification of said identification key;

wherein said printing device periodically reengages said locking mechanism prior to re-verifying said identification key; and further comprising reengaging said locking mechanism whenever said printing device receives a new printing device consumable.

20. A method for verifying a printing device consumable, said method comprising:

storing an identification key on a printing device consumable memory;

interfacing said memory with said printing device;

verifying said printing device consumable for use with said printing device based on said identification key; and disengaging a locking mechanism that selectively disables said printing device upon verification of said identification key;

wherein said printing device periodically reengages said locking mechanism prior to re-verifying said identification key; and further comprising reengaging said locking mechanism whenever said printing device completes a print job.

21. A method for verifying a printing device consumable, said method comprising:

storing an identification key on a printing device consumable memory;

interfacing said memory with said printing device;

verifying said printing device consumable for use with said printing device based on said identification key; and disengaging a locking mechanism that selectively disables said printing device upon verification of said identification key;

wherein said printing device periodically reengages said locking mechanism prior to re-verifying said identification key; and further comprising reengaging said locking mechanism whenever said printing device has printed a specific number of pages.

* * * * *

UNITED STATES PATENT AND TRADEMARK OFFICE

CERTIFICATE OF CORRECTION

PATENT NO. : 7,434,053 B2
APPLICATION NO. : 10/650649
DATED : October 7, 2008
INVENTOR(S) : Travis J. Parry et al.

It is certified that error appears in the above-identified patent and that said Letters Patent is hereby corrected as shown below:

On the title page, item (75), in "Inventors", in column 1, line 1, delete "Bois," and insert -- Boise, --, therefor.

In column 12, line 14, in Claim 1, after "uploading" insert -- an --.

Signed and Sealed this

Thirty-first Day of August, 2010

David J. Kappos
*Director of the United States Patent and Trademark Office*